Oct. 15, 1957　　　S. T. HENNESSY　　　2,809,539
METHOD AND MACHINE FOR ACCURATELY DETERMINING INTERNAL DIAMETERS
Filed Feb. 3, 1955　　　　　　　　　　　　　5 Sheets-Sheet 3

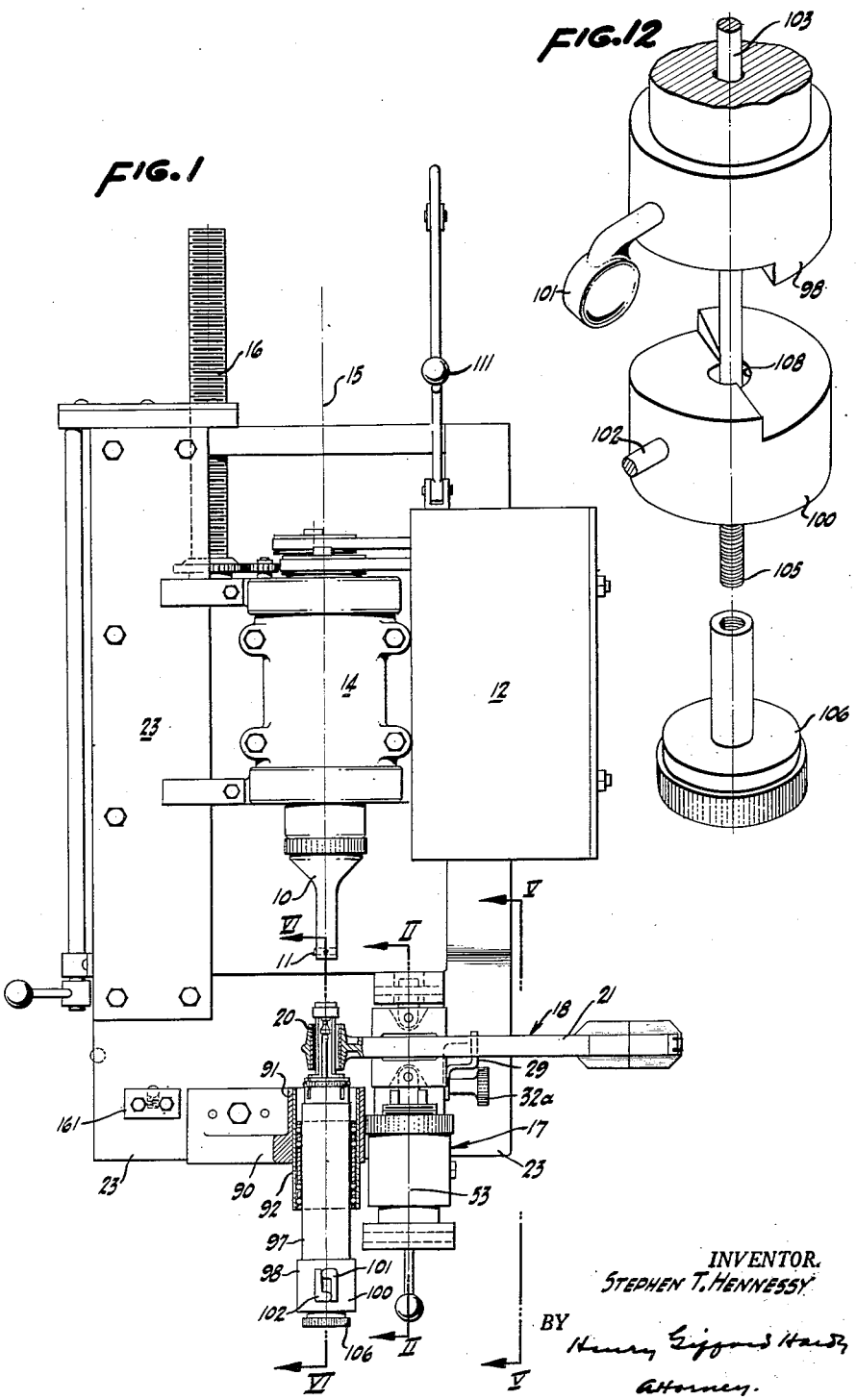

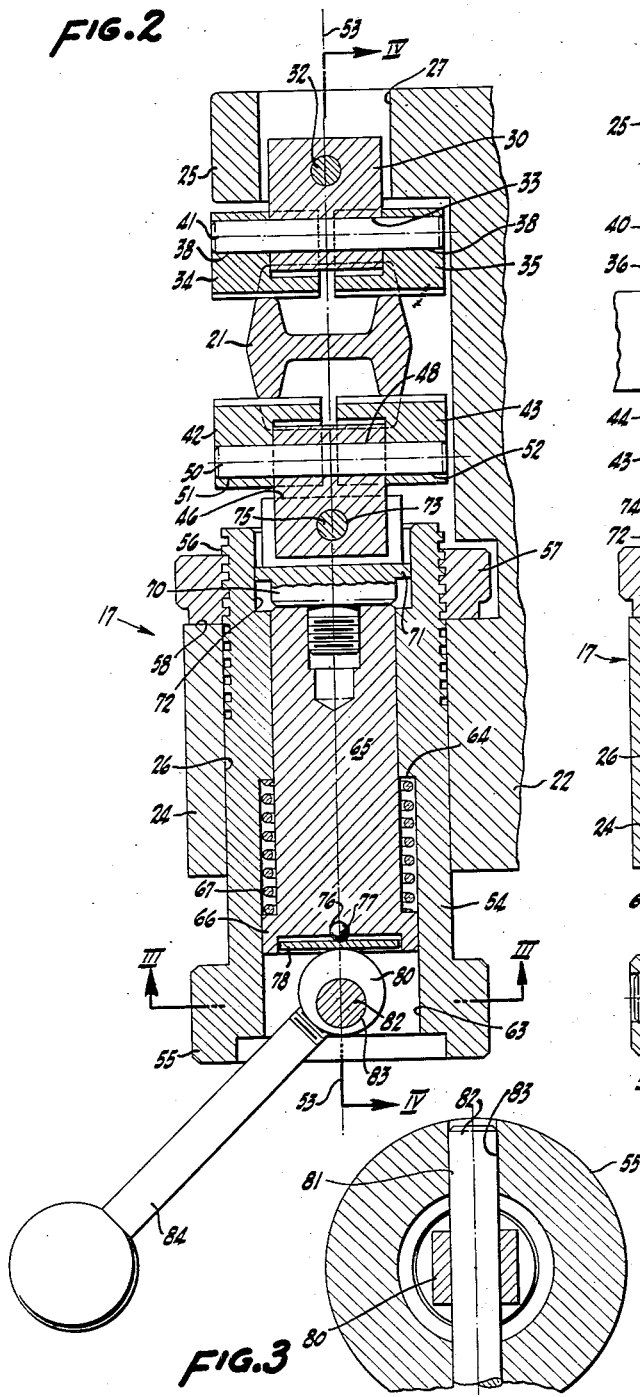

INVENTOR.
STEPHEN T. HENNESSY
BY *Henry Gifford Hardy*
Attorney.

Oct. 15, 1957  S. T. HENNESSY  2,809,539
METHOD AND MACHINE FOR ACCURATELY DETERMINING INTERNAL DIAMETERS
Filed Feb. 3, 1955  5 Sheets-Sheet 4
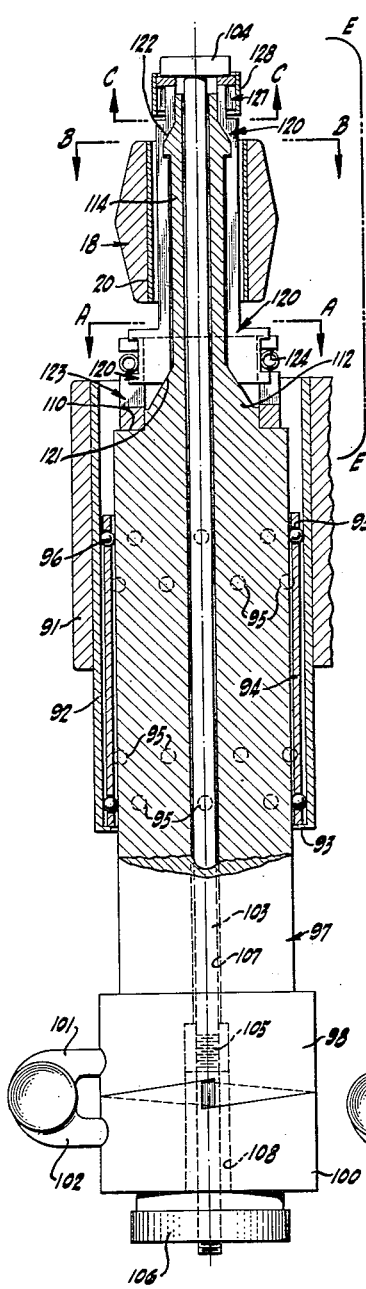
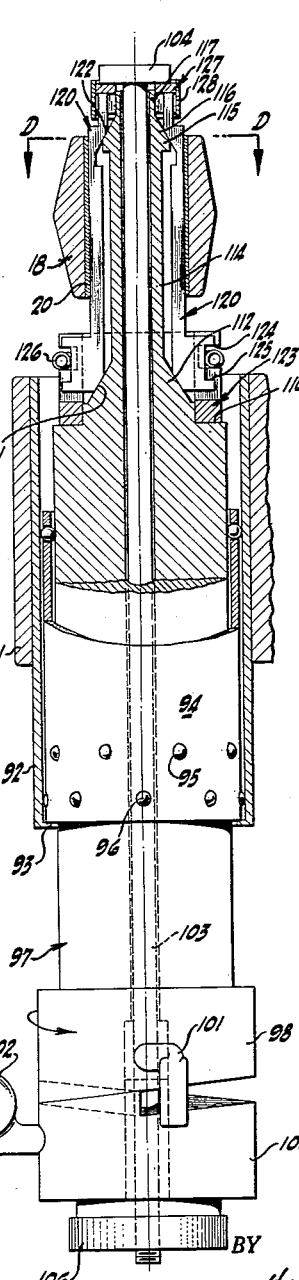
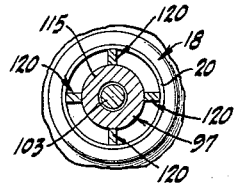
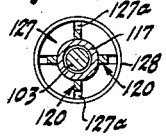
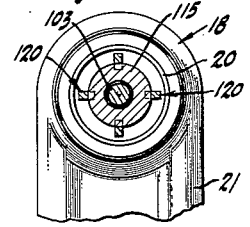
INVENTOR.
STEPHEN T. HENNESSY
BY
Henry Gifford Hardy.
Attorney.

Oct. 15, 1957 S. T. HENNESSY 2,809,539
METHOD AND MACHINE FOR ACCURATELY DETERMINING INTERNAL DIAMETERS
Filed Feb. 3, 1955 5 Sheets-Sheet 5
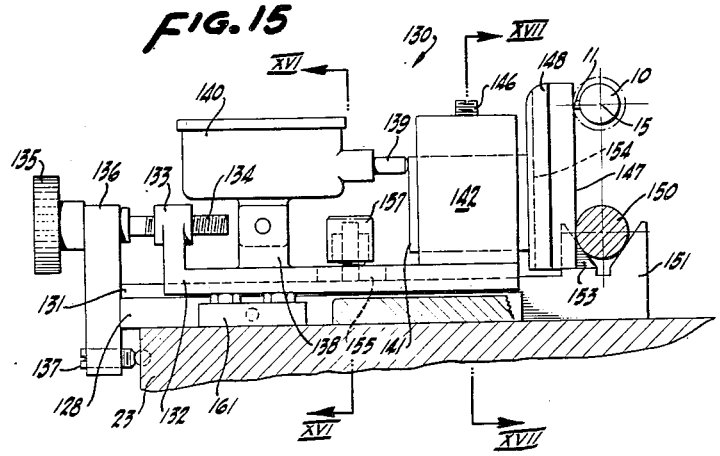
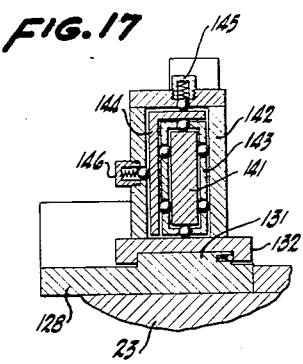
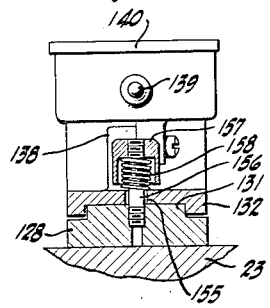
INVENTOR.
STEPHEN T. HENNESSY
BY
Henry Gifford Hardy.
Attorney.

United States Patent Office 2,809,539
Patented Oct. 15, 1957

2,809,539

METHOD AND MACHINE FOR ACCURATELY DETERMINING INTERNAL DIAMETERS

Stephen T. Hennessy, San Francisco, Calif.

Application February 3, 1955, Serial No. 485,979

9 Claims. (Cl. 77—3)

This invention relates to an improvement covering a machine and a method for accurately determining and machining internal diameters, and, more particularly, it relates to a machine which will perform a new method, which will center, measure and machine the internal surface of bushings in accordance with the size of its particular piston pin, with which it will coact.

Piston pins for any specific engine are required to be replaced at intervals because of wear, or in the event of accident. Each pin is an individual and the bushing on which it moves has to be machined so that it will fit and operate properly. It is the accepted procedure to machine the bushing for any particular piston pin after it has been positioned in the connecting rod.

Connecting rods are made in many different shapes and are not usually machined to precise outer contours. Both of these factors make it difficult to hold in proper location during any machining and especially that of a bushing. Accordingly, it is an object of the present invention to provide a machine which will properly hold any form of connecting rod in the precise position for machining after the bushing has been appropriately centered.

Normally bushings do not have extra thickness and in the machining thereof to fit a particular piston pin, not much metal is available for cutting away. Accordingly, the machining must be done accurately the first time or the bushing is spoiled. If the machining is off-center in any way, for example, the bushing will be thinner on one side than on the opposite side, causing the piston to function improperly and result in an unbalanced motion in the engine.

It is an object of the present invention, therefore, to provide a method and one form of machine for carrying out the method, of accurately centering the bushing so that any machining will be exactly concentric with the cutting tool.

It is equally well-known that piston pins vary slightly in size and that a bushing must be machined to exactly fit each particular piston pin. Accordingly, it is necessary to measure and then adjust the cutting tool to the precise measurement of the piston pin so that the same will be machined to exactly fit its bushing. Accordingly, it is an object of the present invention to provide a method and one machine for carrying out the method, which will accurately measure the size of each piston pin so that the bushing for it will be ground and machined precisely to the proper size with the greatest of accuracy.

Further objects are to provide a construction of maximum simplicity, economy and ease of assembly and disassembly, also such further objects, advantages and capabilities as will fully appear and as are inherently possessed by the device and the invention described herein.

The invention further resides in the combination, construction and arrangement of parts illustrated in the accompanying five sheets of drawings, and while there is shown therein a preferred embodiment thereof, it is to be understood that the same is merely illustrative of the invention and that the invention is capable of modification and change, and comprehends other details of construction without departing from the spirit thereof, or the scope of the appended claims.

Referring to the drawings:

Figure 1 is a top plan view of the machine showing a connecting rod being centered with the centering mandrel preparatory to machining the bushing.

Figure 2 is an enlarged vertical section of the special vise assembly taken on the line II—II of Figure 1 and looking in the direction of the arrows.

Figure 3 is a transverse section taken on the line III—III of Figure 2.

Figure 4 is a horizontal section taken on the line IV—IV of Figure 2, looking in the direction of the arrows.

Figure 6 is an enlarged vertical section of the centering mandrel, taken on the line VI—VI of Figure 1, looking in the direction of the arrows, with the blades retracted out of contact with the piston pin bushing.

Figure 7 is a similar vertical section to that of Figure 6, but with the blades expanded to center the bushing.

Figure 8 is a transverse view, partly in section and partly in elevation, taken on the line A—A of Figure 6 and looking in the direction of the arrow.

Figure 9 is a vertical transverse view taken on the line B—B of Figure 6 and looking in the direction of the arrow.

Figure 10 is a vertical transverse section, partly in elevation and partly in section, taken on the line C—C of Figure 6, and looking in the direction of the arrows.

Figure 11 is a vertical transverse section taken on the line D—D of Figure 7, looking in the direction of the arrows.

Figure 12 is an exploded, enlarged view of the opposing cam mechanism of the centering device.

Figure 13 is an exploded, perspective view of the elements in the centering mandrel, covering that portion from E to E in Figure 6.

Figure 15 is a side elevational view of the gauge assembly taken on the line XV—XV in Figure 14.

Figure 16 is a view partly in elevation and partly in section, taken on the line XVI—XVI in Figure 15; and Figure 17 is a transverse vertical section taken on the line XVII—XVII of Figure 15, and looking in the direction of the arrows.

Figure 5:
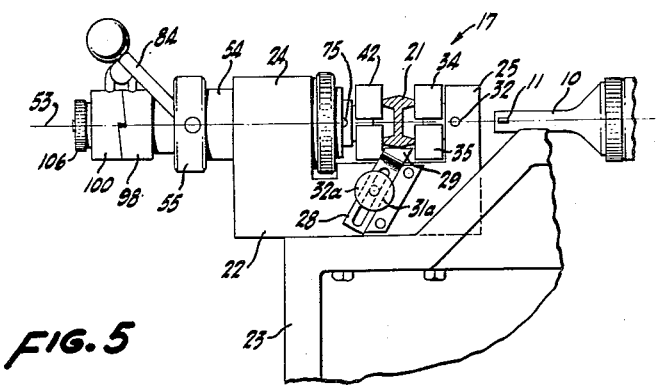
Figure 5 is a side elevational view taken on the line V—V of Figure 1, looking in the direction of the arrows.

Referring now to the drawings wherein like reference numerals indicate like parts in the several views, and particularly to Figure 1 thereof, where the essential features of the machine are shown in top plan view, the tool, itself, has the convnetional rotary chuck 10 with a replaceable and adjustable cutting tool 11, which is driven by any suitable power means, such as a motor (not shown) enclosed within the housing 12. The chuck 10 and its housing 14 and the motor housing 12 are mounted on the bed 23 for precision, horizontal movement on the precise chuck axis 15, controlled by the feed screw 16. The longer movement of in and out of operating position for the chuck 10 is attained by movement of the handle 111 and its linkages (not shown). The carriage for the chuck or boring head is freed of the restriction of the feed screw 16 for such movement by the conventional means of split nuts which disengage the threads.

Precisely parallel with the axis 15 of the chuck 10 and the cutting tool 11 is an assembly, which is designated as the vise 17 and shown in greater detail in Figures 2, 3, 4 and 5. The vise assembly is for holding the connecting rod 18 in position during the centering of its bushing 20 and after centering, to hold it firmly in the adjusted position during the machining. The shank 21 of the connecting rod 18 is known to be made in several different forms and usually in fairly irregular shapes. In most instances they are not machined accurately and are usually castings or forgings. Accordingly, the gripping members of the vise must be made to accommodate these slight irregularities without upsetting the accuracy of the machining operation which is to be performed.

The vise assembly consists of a main body block 22 which is secured in any suitable manner to the bed 23 of the machine. Integral with the block 22 is an upstanding head end 24 and a smaller, but similar upstanding foot end 25. The head end 24 is bored with a longitudinal bore on an axis which is parallel to the axis 15 of the cutting chuck. This bore is indicated by the numeral 26. The foot end 25 is also bored on the same axis, which bore is indicated by the numeral 27 and is of a smaller diameter formed to receive a central block 30 in the resulting hole. Secured to the outer vertical face of the block 22 is a slotted guide 28, having a connecting rod support 29 formed at its upper end. The guide 28 is adjustable along an angular cam face 31a. The adjusted position is maintained by the knurled knob 32a, the shank of which passes through the slot of the guide 28 and is secured within a threaded hole in the block 22. The purpose of the support 29 is to take the weight off of the vise jaws during the centering adjustment and to provide lateral support for the connecting rod during the machining operation.

Because of the slight irregularities of the shanks 21 of the connecting rod and the different forms and designs thereof, these irregularities have to be compensated for by a floating type of jaw. The holding jaws at the foot end of the vise assembly are fixed in position, i. e., they are not moveable longitudinally. These jaws comprise five separate pieces or parts. The first piece is a central block 30 with its nose portion 31 rounded as shown in Figure 4. The block is mounted for limited vertical pivotal movement within the bore 27 by means of pin 32, which passes laterally through the foot end of the block, laterally, perpendicular to and intercepting the axis of the bore 27. The rounded nose portion 31 projecting out of the bore 27 toward the head end is bored vertically to give hole 33. Upper and lower jaw members 34 and 35, respectively, are formed substantially alike. Both have gripping faces which comprise marginal vertical ribs 36 and 37. Both have a vertical bore 38 and both have their rear faces cut out for a portion of the distance as at 40 to accommodate and move around the rounded nose portion 31 of the member 30. The jaw members 34 and 35 are held in limited horizontal rotative movement by pin 41, which passes through the registering bores 38 and 33.

Oppositely disposed is a similar pair of holding jaws comprising upper and lower jaw members 42 and 43, respectively, having their gripping faces provided with marginal vertical ribs 44 and 45. Likewise, a similar block member 46, having a rounded nose portion 47 and a vertical bore 48, supports the jaw members in limited lateral pivotal movement by means of pin 50, which passes through the registering bores 51 and 52 of the members 42 and 43 and the bore 48 of block 46. Here again, each of the block members 42 and 43 has independent rotary movement in a limited horizontal plane around the axis of pin 50 in the same manner as the opposed jaw members 34 and 35. This jaw assembly is movable in a horizontal plane and is required to provide a gripping thrust which is precisely axial on the axis 53 of the vise unit.

To accomplish the required axial movement, a hollow cylindrical member 54 is provided, having an external diameter of a size so that it will move accurately within the bore 26 of the head member 24. The hollow cylinder 54 is provided with an external head 55 having a greater outer diameter and at its opposite end with external substantially squared high speed threads 56. The threads 56 are adapted to receive the internal threads of knurled knob 57, which bears against the vertical inner face 58 of the head portion 24. To prevent rotation of the hollow cylinder 54, a longitudinal groove 60 is cut therethrough in which the stub end 61 of the screw 62 rides with minimum tolerance. The outer end of the hollow cylinder is counterbored at 63 to provide a shoulder 64.

Internally of the member 54 is a solid cylindrical member 65 machined to ride smoothly with minimum tolerance within the internal bore thereof. The cylinder 65 is provided with a crowned head 66 of larger diameter and adapted to ride smoothly with minimum tolerance in the greater bore 63 of the member 54. Around the cylindrical member 65 and bearing against the shoulder 64 and the head 66 is a spring 67 which is subject to compression therebetween. At the opposite end of the cylindrical member 65, it is axially threaded to receive the threaded shank of the cylindrical member 70, which has an enlarged vertically split head 71 adapted to move longitudinally in the counterbore 72 of the member 54. The split head 71 is provided with a lateral bore 73 therethrough which registers with the lateral bore 74 in the block 46 so that pin 75, passing through the registering bores, will hold the moveable jaw assembly in limited vertical movement about the axis of pin 75.

Again referring to the opposite end of the solid cylindrical member 65, in the center of the crown head 66 is an indent 76 in which is placed a ball 77. Above the ball and within the crown 66 is loosely placed a pressure plate 78. Bearing against the pressure plate tangentially and precisely on the axis 53 is an eccentric cylinder 80. The cylinder 80 is maintained in rotatable position by means of pin 81, which passes through the lateral bores 82 in the head members 55 and 83 in the cylinder, itself. The eccentric cylinder 80 is held in tight engagement on the pin 82 by means of handle 84 in the threaded hole 85, which acts as a set screw. It will be observed that by means of the handle 84, the eccentric cylinder 80 may be rotated in a vertical plane so that by the movement thereof, a greater or lesser pressure may be exerted on the pressure plate 78, moving the cylinder 65 against the spring 67. Any slight variation of the point of pressure, at any one time, is fully compensated for by the pressure plate and the ball mounting 77. In this manner there is accurate and even axial thrust and inward push for minute increments of axial movement.

The operation of the vise assembly is quite simple. The shank 21 of the crank rod is placed against the non-moveable set of jaws 34 and 35. Then the knurled nut 57 is rotated to move the moveable set of jaws 42 and 43 into contact on the opposite side and tightened to give the range of adjustment. The support 29 is moved up to contact the under surface of the crank rod into the approximate position and the knob 32 is tightened to give the support during the centering operation. During this adjustment the handle 84 is moved to the downward position, which is the point of smallest radius available on the cylinder 80, so that after centering is obtained, in the manner hereinafter to be described, it may be moved upwardly to provide secure holding of the crank rod during the machining operation.

The centering mandrel assembly, and details thereof, are shown in Figures 6 to 13, both inclusive. As shown by Figure 1, the location of the centering mandrel is adjacent the vise assembly 17, but precisely axially aligned on the axis 15 of the cutting chuck and tool. The centering mandrel is mounted in a housing 90 on the frame 23 of the machine and is provided with an extension 91 which is internally machined to a fine tolerance. As indicated before, the axis of the bore of extension 91 is precisely the axis 15 of the chuck 10 and the cutting tool 11. Internally of the bored extension 91 is a hollow sleeve 92 which extends at its outer end beyond the limits of extension 91 and rearwardly beyond the frame of the machine.

Sleeve 92 is likewise finished to fine tolerances, especially internally. At the outer end of the sleeve 92 there is an inturned flange 93 which acts as a stop. Within the sleeve is a moveable sleeve bearing 94 whose surface is perforated circumferentially as at 95, so as to receive ball bearings 96. The cylindrical sleeve bearing 94 surrounds the main solid cylindrical body portion 97 of the centering mandrel. It will thus be observed that the ball bearings 96, which contact both the inner surface of the sleeve 92 and the outer surface of the body cylinder 97, provide smooth, easy and accurate longitudinal movement and positioning. The outer end of the body member 97 is provided with one-half of a cooperating pair of double stepped cams 98 and 100. Cam 98 is integral with the solid cylindrical body portion 97 and rotates therewith. Each of these cams, 98 and 100, is provided with a finger grip 101 and 102, respectively, and when these finger grips are practically together, as they are shown in Figure 6, the cam faces are in closed position and when they are rotated one-quarter turn, as shown in Figure 7, they are in open position. The rotation, of course, is in a vertical plane at right angles to the longitudinal axis of the mandrel. Running axially through the main body member 97 and through each of the double stepped cams 98 and 100, is a draw bolt 103, having an enlarged head 104 at one end and the other end is threaded, as at 105, to receive an adjusting knob 106. The draw bolt 103 extends through an axial bore 107 in the body portion, while the shank of the adjusting knob 106 fits within an axial counterbore 108 in the cams.

At the opposite end of the body member 97 from its integral cam 98, an assembly is provided which may be accurately expanded and contracted. The body member 97 is machined to produce a shoulder 110 of reduced diameter. From this shoulder is machined a truncated cone-shaped collar 112 which extends into a long cylinder 114 of still further reduced diameter. The tip of this cylinder 114 is machined to have a collar 115 of slightly increased diameter leading to a truncated cone 116, gradually reducing in diameter to a terminus collar 117. It is to be noted that the angle of the slope of the truncated cones 112 and 116 is identical. Radially around this end structure are at least four carefully formed blade members 120, formed with two sloping inner faces, one at either end being 121 and 122, respectively. These two faces 121 and 122 are angled so as to have the same angularity as the faces of the truncated cones 112 and 116. Around the larger of the truncated cones, 112, is a crown collar 123 which fits around the cylindrical portion 114 and is so machined internally as to seat upon the truncated cone member 112 and the shoulder 110 (see Figure 13). Crown collar 123 is provided with an external annular groove 124, and radial slots 125 which are adapted to receive the larger end of the blades 120. The external faces of the larger ends are slotted as at 125 and the slots 125 register with, but are wider than the annular groove 124 when the blades are in place. The blades are retained in place by a ring retaining spring 126. The other end of the blades 120 also are retained against the sloping surface 122 by a smaller crown collar 127, having notches 127a for receiving and aligning the ends thereof. Excessive outward lateral movement of these ends is restrained by the cover collar 128. It will be observed that the large button end 104 of the shaft 103 bears directly against the crown collar 127.

It will be observed from the plan view of Figure 1 that the centering mandrel is in position and precisely in the position shown in Figure 6 with the head 104 of the draw bolt 103 and its surrounding assembly projecting through the bushing 20 of the crank pin.

Figure 14:
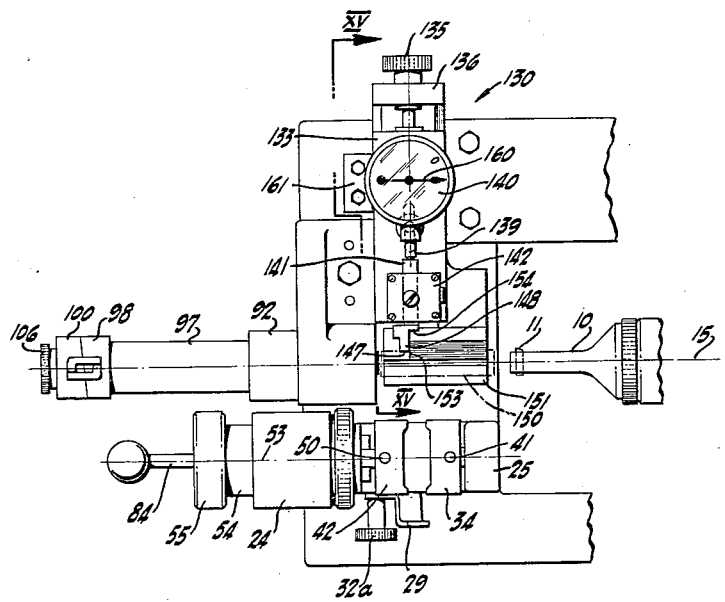
Figure 14 is a top plan view of a portion of the machine only, showing the gauge for setting the cutting tool in accordance with the reading taken of the size of the piston pin.

The operation of the centering mandrel is as follows: A connecting rod 18 is in place on the machine with its bushing 20 centered so that it will receive the exposed blades of the mandrel. The centering mandrel assembly is moved forwardly so that the centering assembly will pass through the bushing 20 and assume the position shown in Figure 6. In this position it will be observed that the finger levers 101 and 102 on the double stepped cams 98 and 100 are closed, indicating the most retracted position of the blades 120. As soon as the mandrel has been moved forward to the position shown in Figure 6, the grip of the vise assembly 17 on the shank 21 of the connecting rod is loosened so that it is resting on the rest 29 and on the centering assembly. The cams 98 and 100 are then rotated in opposite directions, causing longitudinal movement of the body member 97 and each of the blade members 120 to ride outwardly on the cam faces of the truncated cones 112 and 116. The relative rotary movement of the cams 98 and 100 changes the relative position of the blades 120 with respect to their position on the truncated cones 112 and 116. As the cam 100 moves outwardly, it pulls the draw bolt 103 with it, and since its button head 104 bears against the small crown collar 127, a pressure is exerted on the end of the blades 120 and pushes them downwardly as viewed in Figure 6, on the sloping cam faces, against the restriction of spring 126 until their outer faces contact the inner surface of the bushing 20. The equal radial expansion of the blades will center the bushing accurately on the mandrel. Since the mandrel axis is precisely that of the chuck 10, the bushing is accurately centered with respect thereto. When the centering is completed by this means so that the bushing is accurately aligned on the axis 15, then the connecting rod is firmly held in this position by moving the operating handle 84 on the vise upwardly. Because the jaw faces, themselves, are free to pivot on their pin mountings 41 and 50, as well as vertically on pins 32 and 75, accommodation is made for inaccuracies of the shank 21 without placing any strain on the centering mandrel or the centering blades. When the connecting rod is firmly gripped and held in this manner, the blades 102 are released by operating the double stepped cams 98 and 100 back to the position shown in Figure 6, thereby releasing the blades from their engagement with the bushing 20 and permitting the mandrel to be withdrawn rearwardly and out of the way, in the position shown in plan on Figure 14. In this manner, the centering mandrel and its assembly is moved out of the way of the cutting tool 11 for the machining operation.

Although centering of the bushing 20 is important, indeed essential for proper machining of the connecting rod bushing, the size to which they are to be machined is of equal importance. In Figures 14 to 17, both inclusive, the assembly for precisely establishing the radius of the piston pin and setting the cutting tool to the precise radius, is shown in detail. This assembly is generally designated 130. This assembly is mounted for precision horizontal movement on the bed 23 of the tool on a removable base 128 secured in the bed. The entire assembly may be inserted or removed merely by sliding the base 128, in and out of position. The carriage 132 is guided for precision movement on a raised island 131 thereof. At the outer end of the carriage 132 there is provided a bracket 133 which is internally threaded to receive the threaded shank 134 of the thumb screw 135. The block in which the thumb screw 135 freely rotates is attached to the base 128 and to equalize and balance the pressures, a threaded ball contact 137 is provided for bearing against the frame 23. A boss 138 is provided on the base 128 for pivotally mounting a calibrated instrument 140, the dial of which will register accurately the radius of a cylindrical object, such as a piston pin, upon setting and subsequent contact. The direct reading is shown on the dial which is calibrated in accordance with the depth to which the plunger 139 is depressed after contact with the precision block 141 which in turn is in contact with the piston pin 150. The precision block which is in reality a precision bridge, is mounted for smooth, accurate lateral movement inside the housing 142 by means of a rectangular bearing sleeve 143. Inside the housing 142, as shown in Figure 17, the bearing 143 bears against an L-shaped member 144 on two sides, which L-shaped member may be adjusted both vertically and laterally for precision movement by screw bearings 145 and 146. The precision block 141 is provided with a contact face 147, which is offset from an enlarged head portion 148. The face 147 is adapted to contact a piston pin 150 which rests in a V-block 151, a portion of which is cut out as at 153 in order to permit the contact of the face 147 with the tangent of the horizontal diameter of the pin 150. The carriage 132 for head portion 148 has a vertical face 154 which acts as a stop upon contact with the side of the V-block. The V-block 151 is positioned precisely so that its longitudinal center line is in alignment and in the same vertical plane as the axis 15. Accordingly, when the vertical face 154 contacts the side of the V-block 151, the face 147 is precisely parallel with the vertical plane of the axis 15. When the face 147 is brought to just bear against the horizontal diameter of the pin 150, the dial of the gauge 140 may be brought to zero and the pin removed. The carriage assembly 14 with the rotary chuck 10 is then moved into position so that the cutting tool 11 may be adjusted with respect to face 147.

In order to maintain the level longitudinal movement for the carriage 132 on the island 131, the carriage is provided with a longitudinal slot 155 through which passes hold-down screw 156 with its cap 157 and compression spring 158 bearing on its upper surface.

In operating the sizing assembly, which, as indicated before, is a removable assembly placed in position only when the setting of the cutting tool 11 is made with respect to the precise size of the piston pin 150, a precision V-block 151 is placed precisely in the proper alignment with the axis 15. A suitable space on the bed of the machine (not shown) for accurately locating the V-block is provided for this purpose. It will be noted from the plan view that one side of the V of the V-block 151 is cut back at 153 for a portion of its length, so that the precision face 147 of the head 148 may be moved right up to the center line of the V-block 151 corresponding with the axis 15. With the head 148 in this position the carriage 132 is moved up by means of the thumb screw 135 to a point where the plunger 139 just touches the rearward face of the block 141. In this position the reading on the dial of the gauge 140 should be zero. The piston pin 150 is then placed in the groove, causing the face 147, contacting the pin tangentially, to move rearwardly, exerting pressure on the pin 139, which moves the precise distance of the radius of the piston pin 150. The dial on the gauge is calculated to and is calibrated so that the movement of the hand 160 will give an immediate, direct reading, either as to the radius or the diameter of the pin 150. However, as indicated above, after the vertical face 147 is brought into contact with the horizontal diameter of the pin 150 the dial of the gauge 140 should be brought to zero for purposes of adjusting and setting the cutting tool, although it is apparent that any given reading will do. The pin 150 is then removed from the V-block 151, and the carriage assembly 14 with the rotary chuck 10 is moved forwardly along the axis 15 until the cutting tool 11 is in line with the face 147 (see Figure 15). The tool 11 is then adjusted so that its cutting edge just bears against the face 147 and gives the same reading on the dial of gauge 140, zero or the given reading. Since the vertical face 147 is exactly parallel with the vertical plane 15, the radius described by the cutting edge of tool 11 will be precisely that of the radius of pin 150.

When the cutting tool has been so adjusted the assembly 130 and the V-block 151 are removed and the machine is ready to cut the bushing 20 precisely to the size of the pin 150, as shown in plan in Figure 1.

After the reading is taken, the plate 161, which holds the base 128 firmly in position on the bed 23, is loosened and the whole assembly 130 is removed as a unit.

I claim:

1. In a machine of the class described, the combination of cooperating assemblies including a vise assembly comprising two opposed segmented universally mounted jaws, and means for longitudinally moving one of said jaws in both large and small increments for firmly holding an irregular work piece having an internal bore to be machined, a centering mandrel assembly mounted for reciprocating movement into and out of operative position on the precise operating axis of the machine, a portion thereof being of reduced diameter to penetrate the bore of said piece to be concentrically machined, said portion having a series of blades movable outwardly at an equal rate and distance to engage the inner surface of and center the bore of said work piece with respect to the operating axis of the machine, and a power driven rotary chuck and cutting tool mounted oppositely to said centering mandrel for accurate controlled movement on and defining the operating axis of the machine, for cutting the internal face of said bore of the work piece centered by said centering assembly and firmly held in the centered position by said vise.

2. In a machine for internally machining crank rod bushings, the combination of cooperating assemblies including a vise assembly comprising two opposed segmented universally mounted jaws, and means for longitudinally moving one of said jaws in both large and small increments for firmly retaining and holding a crank rod having a bushing to be machined in an offset position, a centering mandrel assembly mounted for reciprocating movement into and out of operative position on the precise operating axis of the machine, a portion thereof being of reduced diameter to penetrate said bushing to be concentrically machined, said portion having a series of blades movable outwardly at an equal rate and distance to engage the inner surface of and center said bushing with respect to the operating axis of the machine, a power driven rotary chuck and cutting tool mounted oppositely to said centering mandrel for accurate controlled movement on and defining the operating axis of the machine, for cutting the internal face of said bushing centered by said centering assembly and firmly offset held in the centered position by said vise.

3. In a machine for internally machining crank rod bushings, the combination of cooperating assemblies including a vise assembly comprising two opposed segmented universally mounted jaws, and means for longitudinally moving one of said jaws in both large and small increments for firmly retaining and holding a crank rod having a bushing to be machined in an offset position, a centering mandrel assembly mounted for reciprocating movement into and out of operative position on the precise operating axis of the machine, a portion thereof being of reduced diameter to penetrate said bushing to be concentrically machined, said portion having a series of blades movable outwardly at an equal rate and distance to engage the inner surface of and center said bushing with respect to the operating axis of the machine, a power driven rotary chuck and cutting tool mounted oppositely to said centering mandrel for accurate controlled movement on and defining the operating axis of the machine, for cutting the internal face of said bushing centered by said centering assembly and firmly offset held in the centered position by said vise, and a removable gauge assembly for measuring and visually recording the precise size of a crank pin and cooperating with said rotary chuck and cutting tool for machining the said bushing to the exact size indicated by the crank pin.

4. The method of accurately centering and machining crank pin bushings while in place in a connecting rod, comprising the steps of measuring the exact size of the crank pin while its axis lies parallel in a vertical plane with the axis of the cutting tool to be used for the machining, setting the cutting tool to the precise size indicated for the crank pin in direct cooperation with the measuring device, loosely holding the connecting rod and bushing to be machined in place for machining, inserting a mandrel through said bushing exactly in line with the axis of said cutting tool, and expanding movable blades on said mandrel radially at the same rate and distance to engage the inner surface of said bushing and center the same with respect to the axis of the cutting tool, clamping the crank rod in the position indicated by the expanded mandrel, retracting the mandrel blades and moving the mandrel out of operative engagement with said bushing, and moving said cutting tool within the said bushing to machine the same to the exact measured size of the crank pin.

5. The method of accurately centering and machining crank pin bushings while in place in a connecting rod, comprising the steps of measuring the exact size of the crank pin with a gauge having vertical stepped surface while its axis lies parallel in a vertical plane with the axis of the cutting tool to be used for the machining, setting the cutting tool in relation to the outermost vertical measuring face of said gauge, loosely holding the connecting rod and bushing to be machined in place for machining, inserting a mandrel through said bushing exactly in line with the axis of said cutting tool, and expanding movable blades on said mandrel radially at the same rate and distance to engage the inner surface of said bushing and center the same with respect to the axis of the cutting tool, clamping the crank rod in the position indicated by the expanded mandrel, retracting the mandrel blades and moving the mandrel out of operative engagement with said bushing, and moving said cutting tool within the said bushing to machine the same to the exact measured size of the crank pin.

6. A vise assembly for retaining irregularly shaped objects accurately in an adjusted position, comprising in combination a pair of opposed universally mounted segmented jaws, one of said jaws being mounted on a cylinder movable laterally and perpendicular to the face of the jaws, a sleeve surrounding said cylinder and cooperating with it to move said jaw in relatively large increments, eccentric means carried by said sleeve for moving said cylinder in relatively small increments and body means for slidably supporting said sleeve and fixedly supporting the stationary jaws.

7. A vise assembly for retaining irregularly shaped objects accurately in an adjusted position, comprising in combination a pair of opposed universally mounted segmented jaws, one of said jaws being mounted on a cylinder movable laterally and perpendicular to the face of the jaws, a sleeve surrounding said cylinder and cooperating with it to move said jaw in relatively large increments, a compression spring surrounding a portion of said cylinder and bearing against a shoulder thereof at one end and against a shoulder in the sleeve at the other, a pressure plate mounted in the opposite end to the jaws, eccentric cylindrical means carried by said sleeve and bearing tangentially against said pressure plate for moving said cylinder against the means for slidably supporting said sleeve and fixedly supporting the stationary jaws.

8. A mandrel for internal centering comprising in combination a cylindrical body member having its penetrating end of reduced diameter and its opposite end one half of a double step cam, said reduced end having spaced indentical sloping cam surfaces, a plurality of radial blade members having sloping inner surfaces engaging said sloping cam surfaces, retention means for movably holding said radial blades in position against said sloping cam surfaces, a corresponding one half of a double step cam, the cam surface of which is in contact with said other one half so that counter rotary movement with respect to each other will produce longitudinal movement, and a tie bolt extending axially through said cylindrical body and the double step cams and bearing at one end against the outer retaining means for said blades and against the corresponding double step cam at the other, so that axial movement produced by the counter rotation of the double stepped cams will result in movement of the said radial blades on the sloping cam faces to reduce or increase the indicated diameter thereof at will.

9. A mandrel for internal centering comprising in combination a cylindrical body member having its penetrating end of reduced diameter and its opposite end one half of a double step cam, said reduced end having spaced identical sloping cam surfaces, a plurality of radial blade members having sloping inner surfaces engaging said sloping cam surfaces, retention means for movably holding said radial blades in position against said sloping cam surfaces, a corresponding one half of a double step cam, the cam surface of which is in contact with said other one half so that counter rotary movement with respect to each other will produce longitudinal movement, a tie bolt extending axially through said cylindrical body and the double step cams and bearing at one end against the outer retaining means for said blades and against the corresponding double step cam at the other, so that the axial movement produced by the counter rotation of the double stepped cams will result in movement of the said radial blades on the sloping cam faces to reduce or increase the indicated diameter thereof at will, and a mounting for said body member including a sleeve bearing and a stationary housing permitting the entire assembly to be moved laterally in and out of operative position with respect to said housing.

References Cited in the file of this patent

UNITED STATES PATENTS

| | | |
|---|---|---|
| 486,609 | Church | Nov. 22, 1892 |
| 722,677 | Crippen | Mar. 17, 1903 |
| 1,203,152 | Steadner | Oct. 31, 1916 |
| 1,544,361 | Wadell | June 30, 1925 |
| 1,830,724 | Storm et al. | Nov. 3, 1931 |